United States Patent
Lu

(10) Patent No.: US 7,412,472 B2
(45) Date of Patent: *Aug. 12, 2008

(54) APPARATUS AND METHOD FOR FILTERING A SIGNAL

(75) Inventor: Joseph Z. Lu, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 733 days.

This patent is subject to a terminal disclaimer.

(21) Appl. No.: 10/719,189

(22) Filed: Nov. 21, 2003

(65) Prior Publication Data

US 2005/0114417 A1    May 26, 2005

(51) Int. Cl.
*G06F 17/10*  (2006.01)
*G05D 7/00*  (2006.01)
(52) U.S. Cl. ...................................... 708/322
(58) Field of Classification Search ................. 708/270, 708/274, 290, 300, 320, 322; 700/282
See application file for complete search history.

(56) References Cited

U.S. PATENT DOCUMENTS

| | | | |
|---|---|---|---|
| 4,536,853 A * | 8/1985 | Kawamoto et al. .......... | 708/272 |
| 6,272,401 B1 * | 8/2001 | Boger et al. ................ | 700/282 |
| 6,278,899 B1 | 8/2001 | Piche et al. | |
| 7,156,116 B2 * | 1/2007 | Lu .............................. | 137/14 |
| 2003/0037081 A1 * | 2/2003 | Vergel ........................ | 708/270 |

FOREIGN PATENT DOCUMENTS

EP    0261765 A2    3/1988

OTHER PUBLICATIONS

Olsson G: "Control of Wastewater Treatment Systems" ISA Transactions, Instrument Society of America. Pittsburgh, PA USA, vol. 31, No. 1. Jan. 1992, pp. 87-96.
International Search Report, dated Apr. 6, 2005, relative to PCT application No. PCT/US 2004/38871, the foreign equivalent to the instant U.S. Appl. No. 10/719,189.

* cited by examiner

*Primary Examiner*—Chuong D Ngo
(74) *Attorney, Agent, or Firm*—Munck Carter, P.C.

(57) ABSTRACT

A method, system, and computer program are provided for filtering a signal. The method, system, and computer program receive a sample of a signal being filtered and identify a bias associated with the sample. The bias includes a cushion and an increment. The method, system, and computer program also output an expected value for the sample of the signal being filtered combined with a portion of the bias. The portion of the bias is based at least partially on a size of the cushion.

22 Claims, 6 Drawing Sheets

APPARATUS AND METHOD FOR FILTERING A SIGNAL

CROSS REFERENCE TO RELATED APPLICATIONS

This patent application is related to U.S. patent application Ser. No. 10/719,092, entitled "APPARATUS AND METHOD FOR OPERATING A VALVE USING A CUSHION FILTER" filed on Nov. 21, 2003, now U.S. Pat. No. 7,156,116 which is incorporated by reference.

TECHNICAL FIELD

This disclosure relates generally to signal processing systems and more specifically to an apparatus and method for filtering a signal.

BACKGROUND

The use of signal processing systems is becoming more and more common in a wide variety of applications. Among other things, these signal processing systems are often used in telecommunications equipment to process wireless signals and in process control equipment to analyze feedback signals. The signals being processed by the signal processing systems are often corrupted by noise or other anomalies.

Conventional signal processing systems filter signals using low-pass filters to remove noise or other anomalies. The low-pass filters often cannot eliminate much of the noise or other anomalies from the signals without impeding the performance of the signal processing systems. Allowing the noise or other anomalies to remain in the signals typically interferes with the operation of the signal processing systems. For example, the signal processing systems may be unable to extract needed information from the corrupted signals.

SUMMARY

This disclosure provides an apparatus and method for filtering a signal.

In one aspect, a method, system, and computer program are provided for filtering a signal. The method, system, and computer program receive a sample of a signal being filtered and identify a bias associated with the sample. The bias includes a cushion and an increment. The method, system, and computer program also output an expected value for the sample of the signal being filtered combined with a portion of the bias. The portion of the bias is based at least partially on a size of the cushion.

In a particular aspect, the cushion in the bias is based at least partially on a prior sample of the signal and an expected value for the prior sample. The increment in the bias is based at least partially on a difference between (1) an actual change between the samples and (2) an expected change between the samples.

In another particular aspect, the method, system, and computer program identify a bias associated with the prior sample. The bias associated with the prior sample includes a cushion of zero and an increment representing the entire bias associated with the prior sample.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
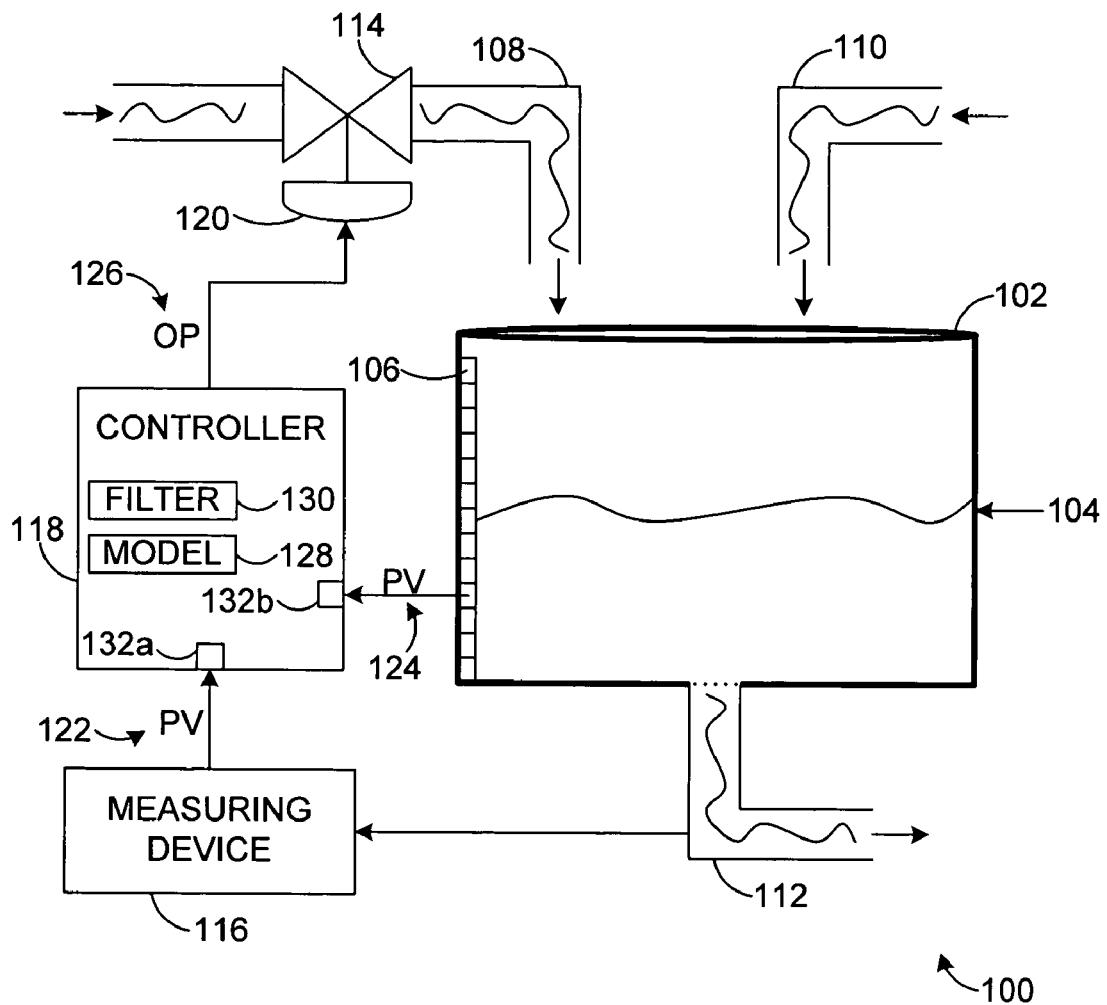
FIG. 1 illustrates an example system for operating a valve using a cushion filter according to one embodiment of this disclosure.

FIG. 1 illustrates an example system 100 for operating a valve using a cushion filter according to one embodiment of this disclosure. The system 100 shown in FIG. 1 is for illustration only. Other embodiments of the system 100 may be used without departing from the scope of this disclosure.

In the illustrated example, the system 100 includes a tank 102 that stores one or more materials. The tank 102 represents any suitable structure capable of retaining one or more materials. The materials in the tank 102 rise to a level 104, which in this example is approximately half of the tank's height. To identify the level 104 of the material(s) in the tank 102, the tank 102 includes one or more sensors 106. The sensors 106 identify or estimate the level 104 of the materials in the tank 102. The sensors 106 include any structure, device, or apparatus for sensing the level 104 of materials in the tank 102. Because the sensors 102 measure a level 104 of materials in the tank 102, one or more sensors 102 may be referred to as a measuring device.

As shown in FIG. 1, material flows into the tank 102 from a first pipe 108 and a second pipe 110, and the material exits the tank 102 through a third pipe 112. Each of the pipes 108-112 represents any suitable structure capable of facilitating the transport of one or more materials. The pipes 108-112 could, for example, represent steel or plastic pipes or tubes capable of facilitating the transport of oil, water, hydrochloric acid, or any other material or materials.

In this example, the first pipe 108 allows material to enter the tank 102 through a valve 114. The valve 114 controls the rate at which the material or materials flow into the tank 102. The valve 114 may, for example, change an opening in the pipe 108, where a larger valve opening allows more material to flow through the pipe 108. The valve 114 includes any structure capable of controlling the flow of one or more materials through a pipe 108.

In the illustrated example, the system 100 uses a feedback loop, which includes a measuring device 116, a controller 118, and a valve adjuster 120, to control the valve 114. The measuring device 116 monitors one or more characteristics associated with the material(s) flowing through the pipe 112. For example, the measuring device 116 may measure the flow rate of material flowing through the pipe 112. The measuring device 116 could monitor any other or additional characteristics of material flowing through the pipe 112. The measuring device 116 also outputs a signal 122 to the controller 118, where the signal 122 includes values identifying the measurements made by the measuring device 116. The flow rate or other monitored characteristic in the system 100 may be referred to as a process variable, and the signal 122 provided to the controller 118 may be referred to as a process variable (PV) signal. The measuring device 116 includes any hardware, software, firmware, or combination thereof capable of measuring at least one characteristic of material flowing through the pipe 112.

The controller 118 controls the opening and closing of the valve 114 in the system 100. In the illustrated embodiment, the controller 118 controls the valve 114 using the process variable signal 122 provided by the measuring device 116 and a signal 124 output by the sensors 106. As an example, the controller 118 may adjust the valve opening so that the level 104 of material in the tank 102 remains at or near a desired level. As a particular example, the controller 118 uses the signal 122 to estimate the amount of material exiting the tank 102, and the controller 118 estimates how to adjust the opening of the valve 114 so that the proper amount of material is replaced in the tank 102. The controller 118 uses the signal 124 to determine if the level 104 is at or near the desired level and to identify when material may be entering the tank 102 from the second pipe 110. The controller 118 also generates an output signal (OP) 126 containing output values, which identify the extent to which the valve 114 should be opened.

In some embodiments, the controller 118 uses a model 128 to predict the behavior of the system 100. The model 128 may, for example, represent expected behaviors of the process variable signals 122, 124 and the output signals 126 that correspond to the expected behaviors. When the controller 118 receives actual values in the signals 122, 124, the controller 118 consults the model 128 and outputs the corresponding values in the output signal 126. In other embodiments, the controller 118 does not use a model 128 to generate the output signal 126. The controller 118 includes any hardware, software, firmware, or combination thereof for controlling the operation of the valve 114.

The valve adjuster 120 uses the values in the output signal 126 to adjust the valve opening or allow the valve 114 to remain in its current position. For example, in some embodiments, the output values in the signal 126 identify the relative amount of change that is needed for the valve 114. In these embodiments, positive values could indicate that the valve 114 should be opened more, negative values could indicate that the valve 114 should be closed more, and zero could indicate that no change is needed. In other embodiments, the output values in the signal 126 identify the absolute position of the valve 114. In these embodiments, a minimum value such as zero could indicate that the valve 114 should be completely closed, a maximum value could indicate that the valve 114 should be completely opened, and a value in between indicates that the valve 114 should be partially opened. The valve adjuster 120 includes any structure capable of opening and/or closing a valve 114.

In this example, the controller 118 attempts to control the operation of the valve 114 so that the material in the tank 102 remains at or near a desired level 104. However, various anomalies in the system 100 typically affect how the controller 118 operates. For example, the material in the tank 102 may be swelling or rippling, and this or other factors cause noise in the signal 124. As another example, the amount of material sent into the tank 102 from the first pipe 108 and the amount of material exiting the tank 102 through the third pipe 112 may be identified by the controller 118, but the material entering the tank 102 from the second pipe 110 may be unknown to the controller 118. This may occur, for example, where the material from the second pipe 110 represents material being recycled from other systems in a processing facility and the amount of material being recycled is unknown at any given time. The material entering the tank 102 from the second pipe 110 represents a disturbance to the level 104 in the tank 102 and is referred to as a "ramp disturbance."

Noise, ramp disturbances, or other anomalies could affect the way in which the controller 118 operates. For example, the controller 118 may respond to the noise or ramp disturbances by attempting to adjust the valve 114. Adjusting the valve 114 may or may not be necessary, and unnecessary adjustments may increase wear on the valve 114 and decrease the operational life of the valve 114.

To help reduce unnecessary adjustments to the valve 114, the controller 118 filters one or more of the signals 122, 124 using one or more cushion filters 130. The signal(s) being filtered may be received by the controller 118 through one or more inputs 132$a$-132$b$, each of which represents any suitable structure for receiving a signal. Conventional process control systems filter signals using low-pass filters, and the low-pass filters often cannot eliminate much of the noise or other anomalies from the signals without impeding the controller performance. In general, a cushion filter 130 prevents the controller 118 from adjusting the valve 114 until it becomes more apparent that the valve 114 needs adjusting. This helps the controller performance to be largely preserved.

The cushion filter 130 receives an input signal (such as signal 122 or 124) and produces a filtered output signal (which is then used by the controller 118). To filter the input signal, the cushion filter 130 receives actual samples of the input signal and attempts to identify or estimate what the samples would be without any noise, ramp disturbances, or other anomalies in the input signal.

For each sample of the input signal, the cushion filter 130 identifies a difference between the actual sample and the estimate of what the sample would be without any anomalies. This difference is referred to as a "bias." The cushion filter 130 then determines how much of the bias should be included in the filtered output signal. In particular, the cushion filter 130 implements a "cushion" in the bias calculation. In effect, the cushion reduces the amount of the bias that the cushion filter 130 includes in the filtered output signal.

Instead of outputting the total bias, the cushion filter 130 outputs a "corrected bias" or "bias correction," which represents the total bias after adjustment using the cushion. As a particular example, for a specific sample of the input signal, the cushion might cause the cushion filter 130 to output ninety percent of the total bias. The cushion is used or held until a consistent signal direction is identified for the input signal. When a consistent signal direction is identified, the cushion can be "released" or no longer used in the bias calculation. At that point, the total bias is used and output by the cushion filter 130. Similarly, the cushion may be held if the input signal reverses direction frequently, which allows the cushion to be used to absorb some or all of the noise in the signal.

In some embodiments, the total bias can be expressed using the equation:

$$\text{Bias}(i) = \text{Bias}_{correction}(i) + \text{Bias}_{cushion}(i) \quad (1)$$

where Bias (i) represents the total bias for sample i, $\text{Bias}_{correction}(i)$ represents the corrected bias for sample i, and $\text{Bias}_{cushion}(i)$ represents the cushion. This equation can be rewritten as:

$$\text{Bias}_{correction}(i) = \text{Bias}(i) - \text{Bias}_{cushion}(i). \quad (2)$$

This illustrates that the amount of bias correction included in the filtered output signal actually represents the total bias minus the cushion provided by the cushion filter 130. Once a consistent signal direction is obtained, the value of $Bias_{cushion}(i)$ may be reduced or set to zero, which releases the cushion.

In some embodiments, such as when a dynamic model is used in predicting the value of a sample, the bias can be expressed using the equation:

$$Bias(i) = y(i) - (\hat{y}(i-1) + dy_{pred}(i)) - dy_{ramp}(i) \quad (3)$$

where y(i) represents the i-th sample of the input signal, $\hat{y}(i-1)$ represents the expected value of the (i−1)-th prediction of y(i), $dy_{pred}(i)$ represents a predicted difference between the i-th expected sample and the (i−1)-th expected sample, and $dy_{ramp}(i)$ represents a change caused by a ramp disturbance. Values for $dy_{pred}(i)$ and $dy_{ramp}(i)$ may be identified using the model 128 or assigned a value of zero if no model 128 is used.

Using Equation (3), an estimate of the i-th sample can be expressed using the formula:

$$\begin{aligned}\hat{y}(i) &= \hat{y}(i-1) + Bias_{correction}(i) \\ &= \hat{y}(i-1) + (1-\lambda) * Bias(i)\end{aligned} \quad (4)$$

where λ represents the filter constant of the cushion filter 130. In particular embodiments, the value of λ resides between zero and one.

Equation (3) shown above for calculating the bias may be rewritten as follows:

$$\begin{aligned}Bias(i) &= \{y(i-1) - \hat{y}(i-1)\} + \{dy(i) - dy_{pred}(i) - dy_{ramp}(i)\} \\ &= \{cushion\} + \{increment\}\end{aligned} \quad (5)$$

where cushion represents the cushion implemented by the cushion filter 130 and increment represents a mismatch between the expected change and the actual change in the samples of the input signal being filtered. In general, if the input signal follows the model 128 or has low noise, this results in a smaller increment. If the input signal varies from the model 128 or has more noise, this results in a larger increment. As explained below, the values of the cushion and the increment are used to determine how much of the cushion should be saved and used to further filter the input signal.

Although FIG. 1 illustrates an example system 100 for operating a valve 114 using a cushion filter 130, various changes may be made to FIG. 1. For example, the controller 118 could control the operation of any number of valves 114. Also, the valve 114 and the valve adjuster 120 could form a single integral unit. In addition, FIG. 1 represents one operational environment in which the cushion filter 130 may be used. The cushion filter 130 may be used in any other system to filter any other signal(s).

Figure 2:
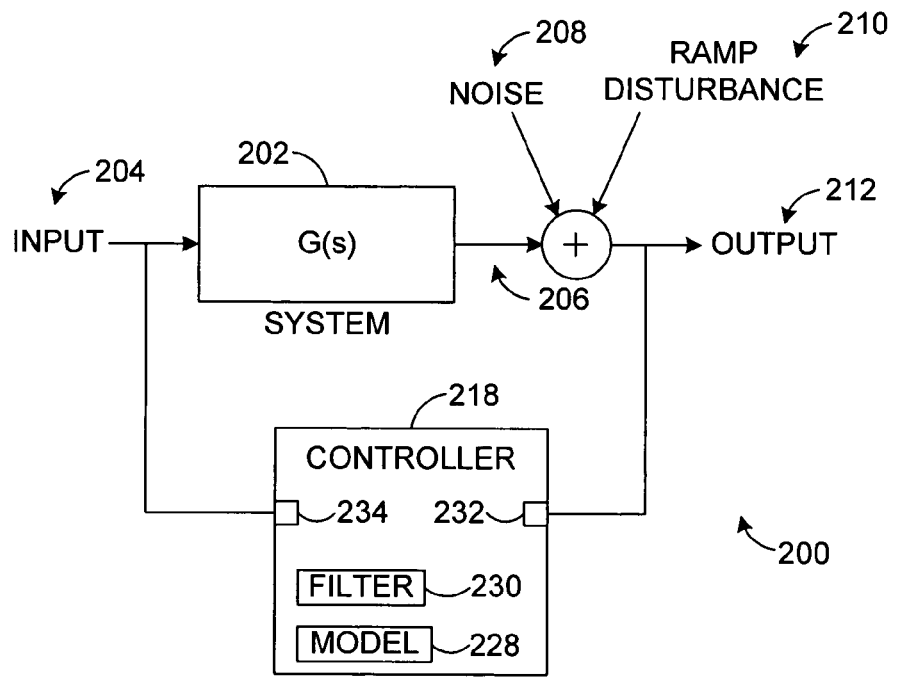
FIG. 2 illustrates an example representation of a feedback loop for operating a generic system using a cushion filter according to one embodiment of this disclosure.

FIG. 2 illustrates an example representation 200 of a feedback loop for operating a generic system using a cushion filter according to one embodiment of this disclosure. This representation 200 may be used to represent the system 100 of FIG. 1 or any other system in which a cushion filter is used to filter a signal. The representation 200 shown in FIG. 2 is for illustration only. Other representations of a control system may be used without departing from the scope of this disclosure.

In this example embodiment, a controller 218 is used to control a system 202. The system 202 represents any suitable system for receiving an input signal 204 and generating an ideal output signal 206 based on the input signal 204. The system 202 could, for example, represent a manufacturing or other processing system, a signal processing system, or any other suitable system. In some embodiments, the controller 218 uses a model 228 to predict the future behavior of the system 202. In other embodiments, no model 228 is used by the controller 218.

Ideally, the controller 218 could use the ideal output signal 206 to control the system 202. In practice, the ideal output signal 206 is often corrupted by noise 208, ramp disturbances 210, or other anomalies, which lead to the production of an actual output signal 212.

As shown in this representation 200, the controller 218 only has access to an output signal 212 that has been altered because of noise 208 or ramp disturbances 210. To facilitate more accurate control over the system 202, the controller 218 includes a cushion filter 230, which filters the actual output signal 212. This helps to reduce or eliminate the effects of noise 208 and other anomalies on the controller 218. In particular embodiments, the cushion filter 230 functions according to Equations (1)-(5) as shown above. The signal 212 is received by the controller 218 through an input 232, and an output signal is communicated through an output 234.

Although FIG. 2 illustrates one example of a representation 200 of a feedback loop for operating a generic system 202 using a cushion filter 230, various changes may be made to FIG. 2. For example, the ideal output signal 206 from the system 202 could be altered by only one of the noise 208 and the ramp disturbance 210. Also, FIG. 2 represents one operational environment in which the cushion filter 230 may be used. The cushion filter 230 may be used in any other system to filter any other signal(s). As a particular example, the cushion filter 230 could be used in other locations other than a feedback loop.

Figure 3A:
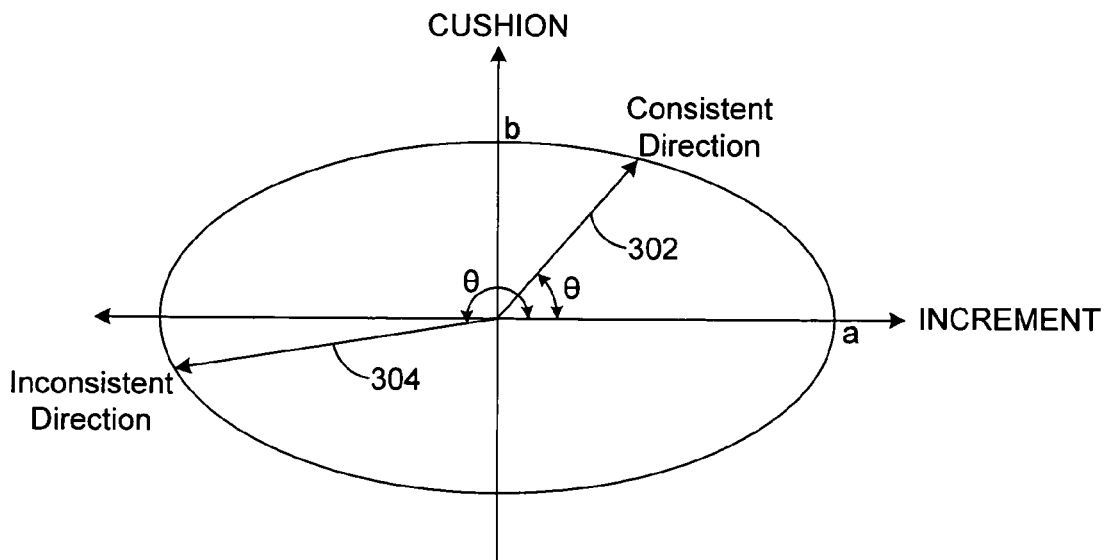
FIGS. 3A and 3B illustrate example mechanisms for holding and releasing a cushion in a cushion filter according to one embodiment of this disclosure.
Figure 3B:
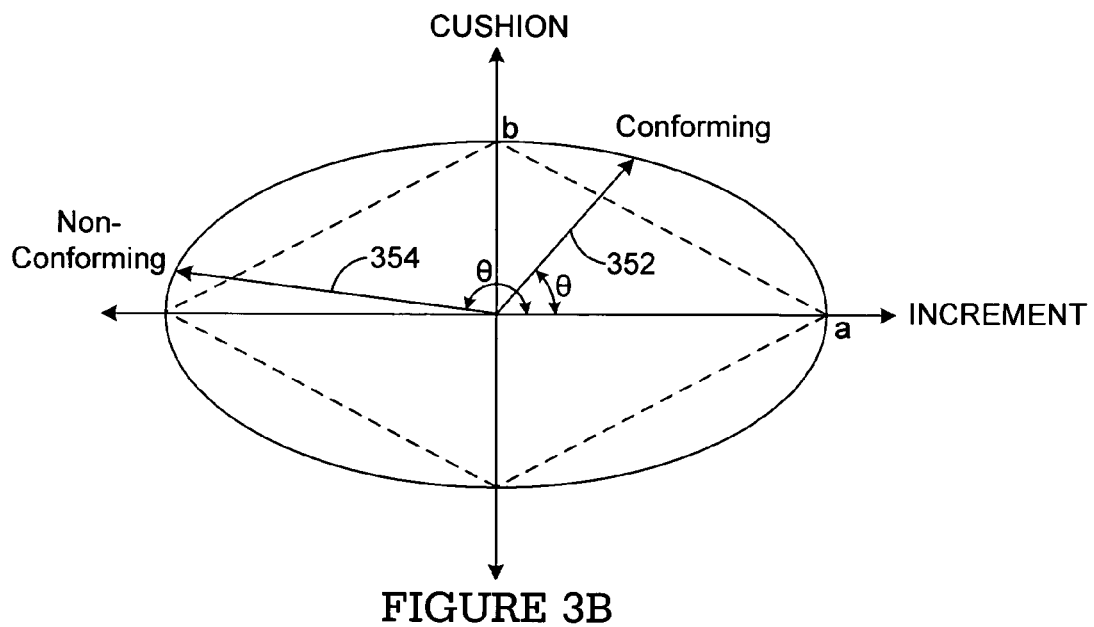

FIGS. 3A and 3B illustrate example mechanisms for holding and releasing a cushion in a cushion filter according to one embodiment of this disclosure. For ease of explanation, the mechanisms shown in FIGS. 3A and 3B are described with respect to the cushion filter 130 of FIG. 1. The same or similar mechanisms could be used by the cushion filter 230 of FIG. 2 or any other suitable cushion filter.

As shown in FIG. 3A, two vectors 302, 304 represent two possible bias corrections calculated using Equation (5) above. In particular, the vectors 302, 304 are plotted along an ellipse, where two axes represent the cushion and the increment shown in Equation (5). The ellipse reaches a maximum value of a along the increment axis and a maximum value of b along the cushion axis.

In general, when a vector 302 representing a bias correction is more parallel to the cushion axis, this indicates that the signal being filtered has a more consistent signal direction. In other words, the signal being filtered is more consistent with a model 128 or has a smaller amount of noise. As a signal becomes more consistent and the vector 302 approaches the cushion axis, this indicates that the cushion may be released by the cushion filter 130. In this case, there is less variation between the expected and actual values of the signal being filtered, so there is less need for a cushion. The cushion filter 130 therefore may filter the signal using a smaller cushion or no cushion.

When a vector 304 representing a bias correction is more parallel to the increment axis, this indicates that the signal being filtered has a less consistent signal direction. In other words, the signal being filtered is more inconsistent with the model 128 or has a larger amount of noise. When a signal is inconsistent, the cushion filter 130 holds the cushion and does not release it. In this case, the cushion filter 130 waits to see if the inconsistency is temporary, such as when it is caused by noise.

In either case, the cushion filter 130 may provide all or part of the change in the signal being filtered to the controller 118. The controller 118 may then adjust the opening of the valve 114 consistent with the change received from the cushion filter 130. For example, when only part of the change is used, the controller 118 may make a smaller adjustment to the valve 114, rather than a larger adjustment as indicated by the signal being filtered. In this way, the cushion filter 130 may wait and see if inconsistent values in a signal being filtered are temporary (and therefore do not require valve adjustment).

In particular embodiments, the cushion filter 130 uses directional weighting to provide part of a change in a signal being filtered to the controller 118. For example, a vector 302, 304 represents a vector starting at the origin of the axes to a point (x,y) in space. Using elliptical weighting as shown in FIG. 3A, the weight of the vector may be determined using the formulas:

$$\text{Weight} = (x^2 + y^2)^{0.5} \quad (6)$$

$$x = a*\sin(\theta) \quad (7)$$

$$y = a*\cos(\theta) \quad (8)$$

$$\theta = \tan^{-1}(\text{Cushion/Increment}). \quad (9)$$

Equation (6) may be simplified and expressed as:

$$\text{Weight} = [(a^2*I^2 + b^2*C^2)/(I^2 + C^2)]^{0.5} \quad (10)$$

where I represents the increment and C represents the cushion.

The weight of the vector can be incorporated into the calculation of the bias by modifying Equation (3) as follows:

$$\text{Bias}(i) = \{y(i) - (\hat{y}(i-1) + dy_{pred}(i)) - dy_{ramp}(i)\}/\text{weight} \quad (11)$$

where weight represents the weight of the vector identified using Equation (10). In this example, unexpected changes to a signal being filtered result in a larger weight, which reduces the value of Bias(i) and hence the value of $\text{Bias}_{correction}(i)$. Using Equation (1), a smaller bias correction leads to the use of a larger cushion. Similarly, expected changes to a signal being filtered result in a smaller weight, increasing the value of Bias(i) and hence the value of $\text{Bias}_{correction}(i)$ and resulting in the use of a smaller cushion.

As shown in FIG. 3B, the cushion filter 130 could also use a diamond weighting to adjust the bias correction. In this example, the weight of a vector 352, 354 may be calculated using the formula:

$$\text{Weight} = (a*|I| + b*|C|)/(|I| + |C|). \quad (12)$$

This weight may then be used in Equation (11).

The cushion filter 130 that operates using the above equations may provide better noise attenuation than low-pass filters. In the system 100 of FIG. 1, better performance by the cushion filter 130 may result in fewer adjustments to the valve 114, which may help to prolong the operating life of the valve 114. Also, the cushion filter 130 could support one or both of elliptical and diamond weighting, and it can be easily tuned by selecting values for a and b. As particular examples, the cushion filter 130 could be tuned by selecting a value of a typically between three and ten and a value of b typically between 0.75 and one. Moreover, the cushion may be generated by the cushion filter 130 using a single sample of the signal being filtered. In addition, the cushion filter 130 is very flexible, can be used in many different types of applications, and is often simple to implement.

Although FIGS. 3A and 3B illustrate two examples of mechanisms for holding and releasing a cushion in a cushion filter, various changes may be made to FIGS. 3A and 3B. For example, any suitable mechanisms may be used to weight the vectors.

Figure 4A:
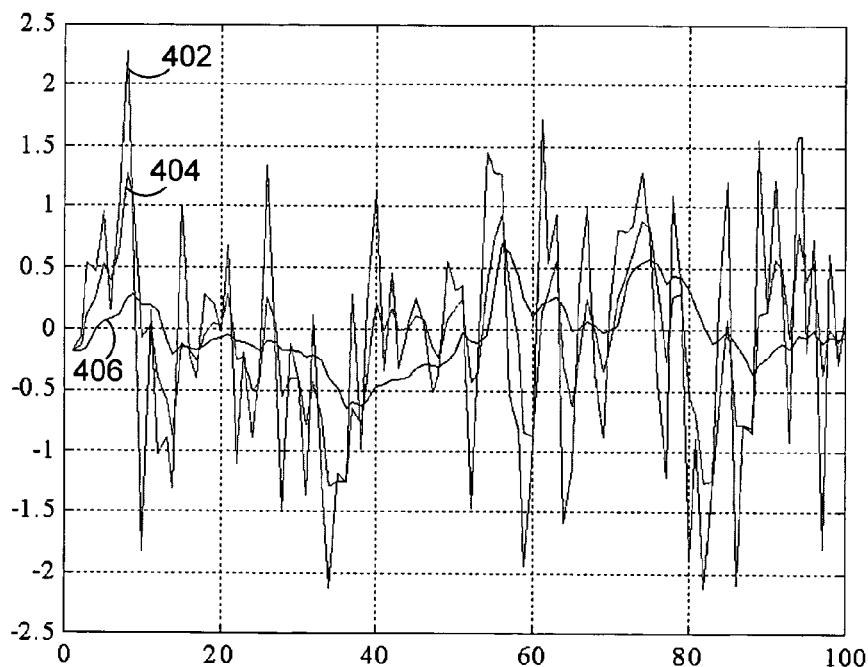
FIGS. 4A through 4C illustrate example effects of using a cushion filter according to one embodiment of this disclosure.
Figure 4B:
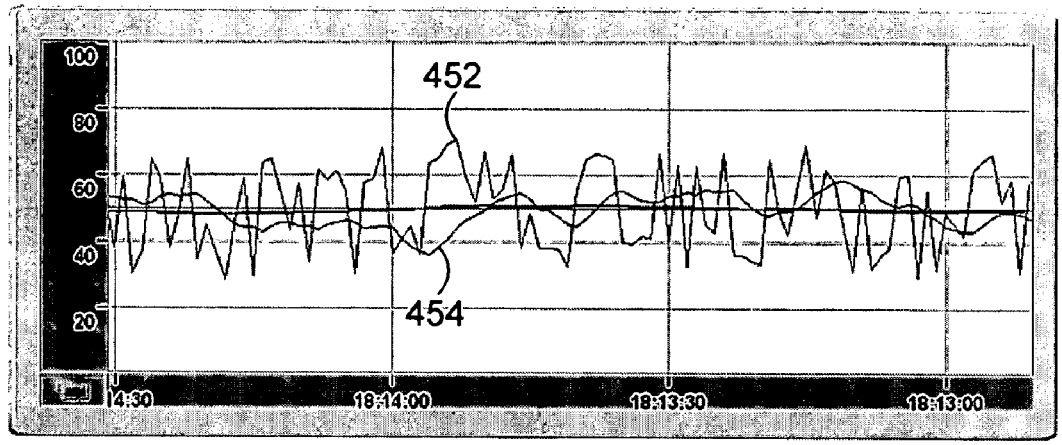
Figure 4C:
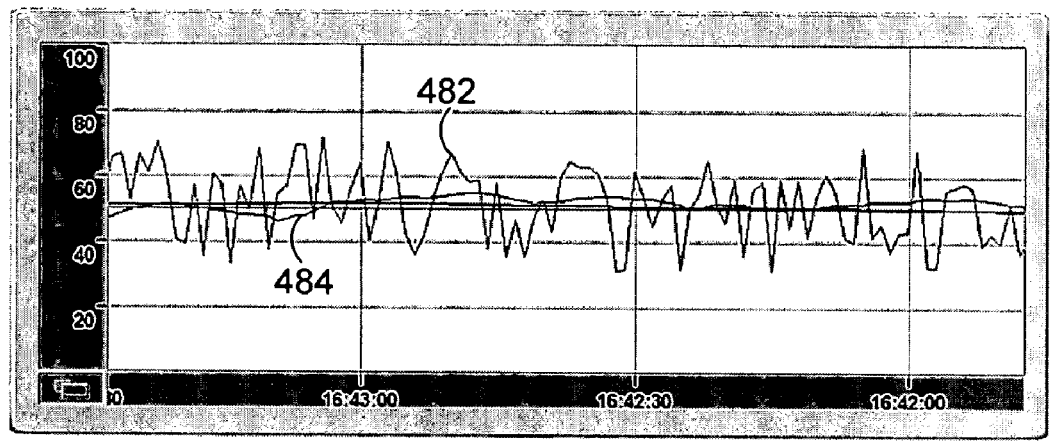

FIGS. 4A through 4C illustrate example effects of using a cushion filter 130 according to one embodiment of this disclosure. For ease of explanation, the effects shown in FIGS. 4A through 4C are described with respect to the cushion filter 130 of FIG. 1. The same or similar effects could be seen using the cushion filter 230 of FIG. 2 or any other suitable cushion filter.

FIG. 4A illustrates a comparison between the filtering performed by a low-pass filter and the filtering performed by the cushion filter 130. In particular, FIG. 4A illustrates an input signal 402 to be filtered. In this example, the input signal 402 does not maintain a consistent signal direction. Instead, the input signal 402 represents normal random noise that varies widely from one extreme to the other. FIG. 4A also illustrates a low-pass filtered input signal 404 and a cushion-filtered input signal 406. The low-pass filtered input signal 404 represents the input signal 402 after being filtered by a low-pass filter, and the cushion-filtered input signal 406 represents the input signal 402 after being filtered by the cushion filter 130. In this example, the low-pass filtered input signal 404 still varies by quite a large amount, while the cushion-filtered input signal 406 varies much less.

The cushion-filtered input signal 406 still tracks the general behavior of the original input signal 402. For example, when the input signal 402 generally becomes higher, the cushion-filtered input signal 406 also becomes higher. Similarly, when the input signal 402 generally becomes lower, the cushion-filtered input signal 406 also becomes lower. However, the cushion-filtered input signal 406 has fewer peaks and valleys than the original input signal 402 and the low-pass filtered input signal 404.

If the original signal 402 represents a process variable signal 122, 124 used by the controller 118 of FIG. 1, the use of a low-pass filter to filter the input signal 402 may still result in unnecessary adjustments to the valve 114. This is because the low-pass filtered input signal 404 still varies widely. In contrast, the cushion-filtered input signal 406 does not vary as much, so use of the cushion-filtered input signal 406 may result in fewer adjustments to the valve 114.

Actual use of the cushion filter 130 in a valve controller 118 is illustrated in FIGS. 4B and 4C. In FIG. 4B, a process variable signal 452 is plotted against the corresponding output signal 454 generated by the controller 118, where the controller 118 uses a low-pass filter. As shown in FIG. 4B, the process variable signal 452 varies widely, having among other things been corrupted by noise and/or ramp disturbances. Based on this process variable signal 452, the controller 118 adjusts the valve 114 quite often as seen by the output signal 454.

In contrast, FIG. 4C illustrates a process variable signal 482 that is plotted against the corresponding output signal 484, where the controller 118 uses a cushion filter 130. As shown in FIG. 4C, the process variable signal 482 still varies widely, but the controller 118 adjusts the valve 114 less than in FIG. 4B. This indicates that the valve 114 travels less when the cushion filter 130 is used in place of a low-pass filter. In this particular example, the valve travel is reduced by a factor of three. Reducing valve travel helps to improve flow through the pipe 108 and extend the life of the valve 114.

Although FIGS. 4A through 4C illustrate examples of the effects of using a cushion filter 130, various changes may be made to FIGS. 4A through 4C. For example, the various plots shown in FIGS. 4A through 4C represent specific examples of the use and non-use of a cushion filter 130. These plots are for illustration. Other cushion filters could function in any other suitable manner.

Figure 5:
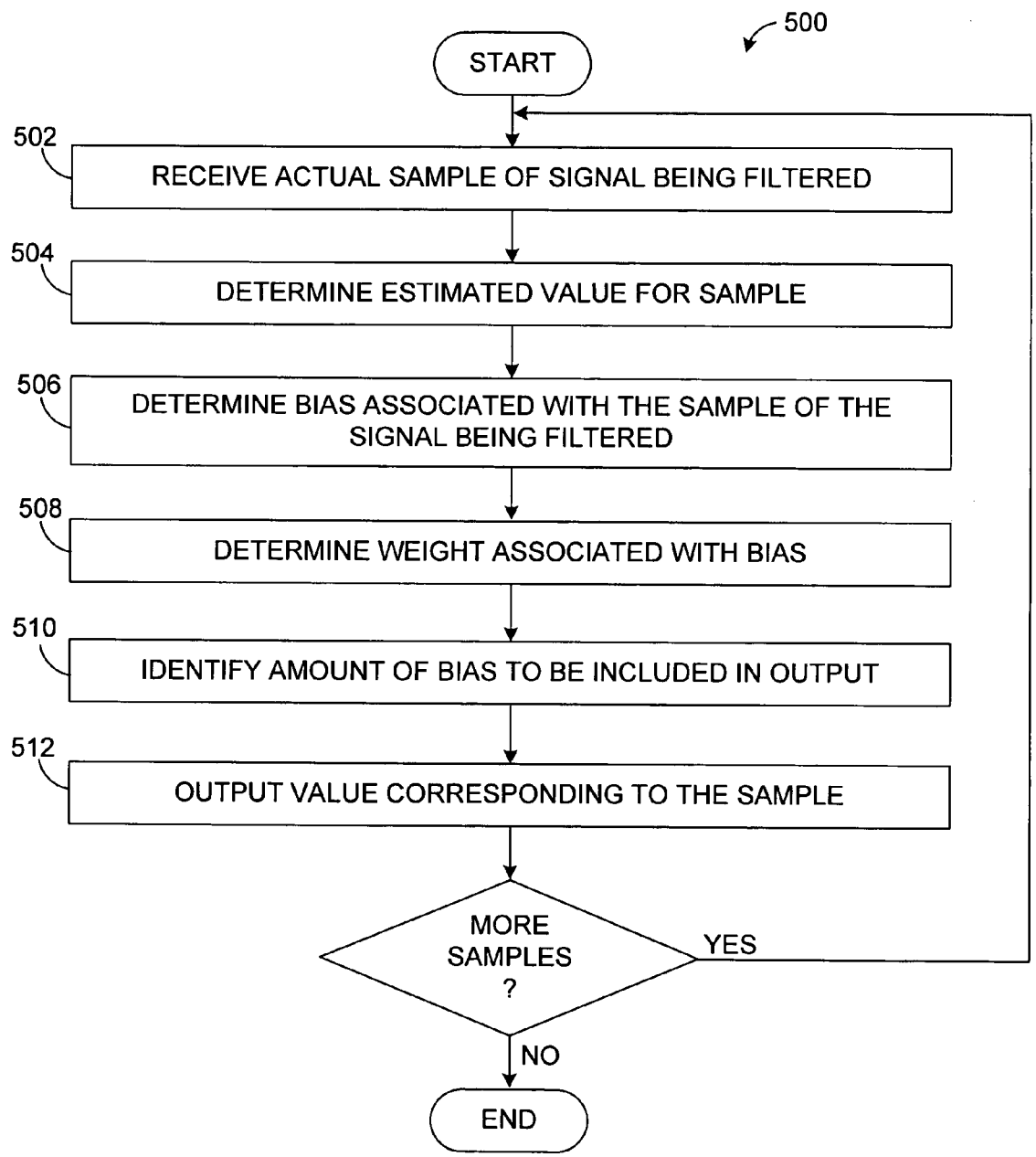
FIG. 5 illustrates an example method for filtering a signal using a cushion filter according to one embodiment of this disclosure.

FIG. 5 illustrates an example method 500 for filtering a signal using a cushion filter according to one embodiment of this disclosure. For ease of illustration and explanation, the method 500 is described with respect to the cushion filter 130 operating in the system 100 of FIG. 1. The method 500 could be used by any suitable cushion filter in any suitable system.

The cushion filter 130 receives an actual sample of a signal being filtered at step 502. This may include, for example, the cushion filter 130 receiving a sample of a process variable signal 122, 124 or any other signal being filtered. The cushion filter 130 determines an estimated or expected value for that sample at step 504. This may include, for example, the cushion filter 130 using a model 128 to estimate the value of the sample. If no model 128 is available, this may include the cushion filter 130 using the previous sample of the signal being filtered (if any) as the estimate.

The cushion filter 130 identifies a difference or bias associated with the sample at step 506. This may include, for example, the cushion filter 130 identifying the bias by identifying a cushion and an increment using Equation (5) above.

The cushion filter 130 determines a weight associated with the bias at step 508. This may include, for example, the cushion filter 130 using elliptical, diamond, or other weighting mechanism to determine a weight associated with the bias.

The cushion filter 130 identifies the amount of bias to be included in an output signal using the identified weight at step 510. This may include, for example, the cushion filter 130 dividing the identified bias by the weight to produce a modified bias as shown in Equation (11).

The cushion filter 130 outputs a value corresponding to the sample at step 512. This may include, for example, the cushion filter 130 outputting the estimated value of the sample combined with a small part of the bias (if the weight is large) or a large part of the bias (if the weight is small).

If additional samples will be received, the cushion filter 130 then returns to step 502 to receive and process a new sample. Otherwise, the cushion filter 130 has completed the filtering of the signal, and the method 500 ends.

In particular embodiments, during the first pass through the method 500, the cushion filter 130 may not have an estimate of a prior sample to use while calculating the bias at step 506. Because no estimate of a prior sample is available, the cushion filter 130 may assume that there is no cushion at step 506. This procedure may be referred to as initialization. After that, the cushion filter 130 may identify both a cushion and an increment at step 506, and the cushion filter 130 performs normally after that. In this way, the cushion filter 130 lags behind the signal being filtered by a single sample, and the cushion is generated by the cushion filter 130 using a single sample.

Although FIG. 5 illustrates one example of a method 500 for filtering a signal, various changes may be made to FIG. 5. For example, the cushion filter 130 could estimate the value of a sample before receiving the actual sample.

Figure 6:
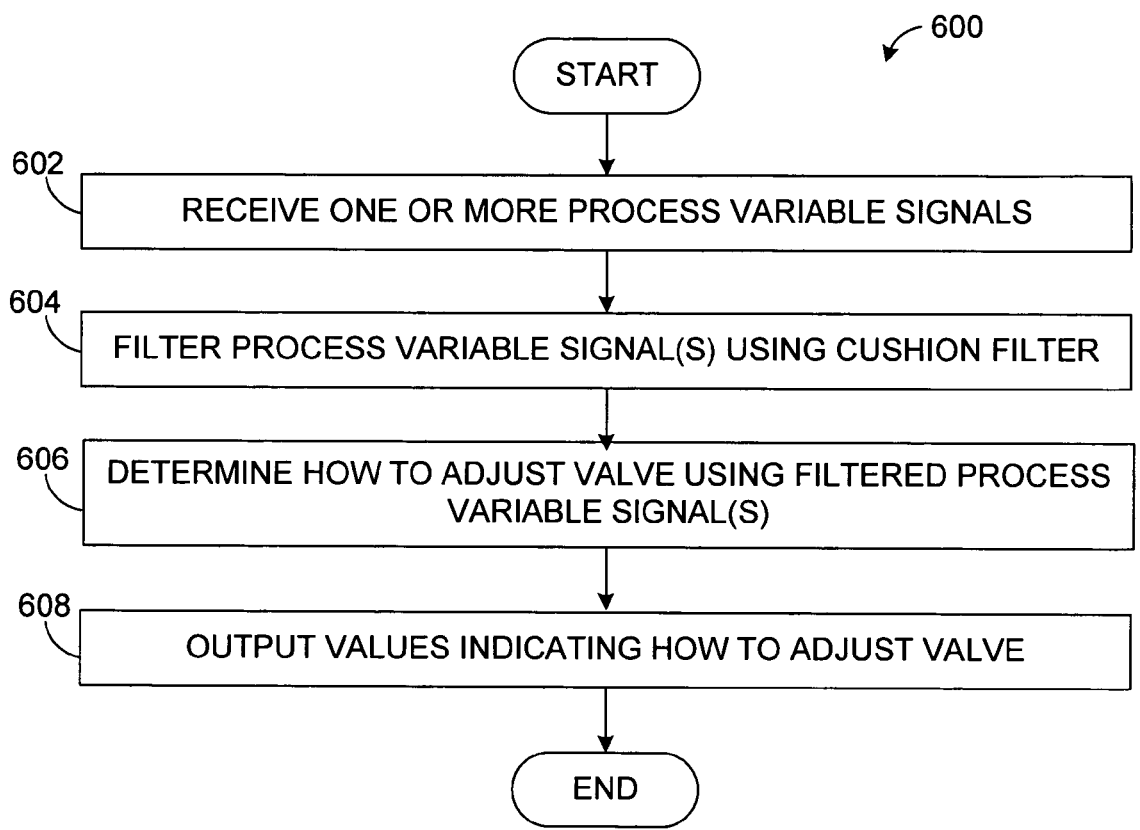
FIG. 6 illustrates an example method for operating a valve using a cushion filter according to one embodiment of this disclosure.

FIG. 6 illustrates an example method 600 for operating a valve using a cushion filter according to one embodiment of this disclosure. For ease of illustration and explanation, the method 600 is described with respect to the controller 118 in system 100 of FIG. 1. The method 600 could be used by any suitable controller in any suitable system to control one or more valves.

The controller 118 receives one or more process variable signals at step 602. This may include, for example, the controller 118 receiving a process variable signal 122 identifying a flow rate of materials through a pipe. This may also include the controller 118 receiving a process variable signal 124 identifying the level of material in a tank 102.

The controller 118 filters the one or more process variable signals using at least one cushion filter 130 at step 604. This may include, for example, the cushion filter 130 using the method 500 shown in FIG. 5 to filter one or more of the process variable signals 122, 124.

The controller 118 determines how to adjust a valve 114 using the one or more filtered process variable signals at step 606. This may include, for example, the controller 118 consulting a model 128 and identifying the values in the model 128 that correspond to the filtered process variable signals 122, 124.

The controller 118 outputs values indicating how the valve 114 should be adjusted at step 608. This may include, for example, the controller 118 outputting an output signal 126 to a valve adjuster 120. The output signal 126 contains one or more output values used by the valve adjuster 120 to adjust the valve 114.

Although FIG. 6 illustrates one example of a method 600 for operating a valve using a cushion filter, various changes may be made to FIG. 6. For example, the method 600 may represent a repetitive process, where the controller 118 repeatedly performs the steps in the method 600.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for filtering a signal, comprising:
   receiving a sample of the signal being filtered;
   identifying a bias associated with the sample, the bias identifying a difference between an actual value of the sample and an expected value of the sample, the bias comprising a cushion and an increment;
   identifying a portion of the bias based at least partially on a size of the cushion; and
   outputting the expected value of the sample combined with the portion of the bias.

2. The method of claim 1, wherein:
the cushion in the bias is based at least partially on an actual value of a prior sample of the signal and an expected value for the prior sample; and
the increment in the bias is based at least partially on a difference between (1) an actual change between the sample and the prior sample and (2) an expected change between the sample and the prior sample.

3. The method of claim 1, wherein outputting the expected value of the sample combined with the portion of the bias comprises:
identifying a weight associated with the bias; and
dividing the bias by the weight to identify the portion of the bias to be combined with the expected value of the sample.

4. The method of claim 3, wherein identifying the weight comprises:
identifying a larger weight when the increment is relatively large compared to the cushion; and
identifying a smaller weight when the cushion is relatively large compared to the increment.

5. The method of claim 4, wherein:
the weight is larger when the signal being filtered has an inconsistent signal direction; and
the weight is smaller when the signal being filtered has a consistent signal direction.

6. The method of claim 3, wherein:
identifying the weight comprises identifying the weight using one of elliptical weighting and diamond weighting;
the elliptical weighting and the diamond weighting are associated with a first maximum value along an axis representing the increment and a second maximum value along an axis representing the cushion, the first maximum value larger than the second maximum value.

7. The method of claim 6, wherein:
the first maximum value lies between three and ten; and
the second maximum value lies between 0.75 and one.

8. The method of claim 1, further comprising identifying a bias associated with a prior sample, the bias associated with the prior sample comprising a cushion of zero and an increment representing the entire bias associated with the prior sample.

9. The method of claim 1, wherein identifying the expected value for the sample comprises identifying the expected value using a model.

10. An apparatus, comprising:
an input operable to receive a signal; and
a filter operable to filter the signal by:
identifying a bias associated with a sample of the signal, the bias identifying a difference between an actual value of the sample and an expected value of the sample, the bias comprising a cushion and an increment;
identifying a portion of the bias based at least partially on a size of the cushion; and
outputting the expected value of the sample combined with the portion of the bias.

11. The apparatus of claim 10, wherein:
the cushion in the bias is based at least partially on an actual value of a prior sample of the signal and an expected value for the prior sample; and
the increment in the bias is based at least partially on a difference between (1) an actual change between the sample and the prior sample and (2) an expected change between the sample and the prior sample.

12. The apparatus of claim 10, wherein the filter is operable to output the expected value of the sample combined with the portion of the bias by:
identifying a weight associated with the bias; and
dividing the bias by the weight to identify the portion of the bias to be combined with the expected value of the sample.

13. The apparatus of claim 12, wherein:
the weight is larger when the signal being filtered has an inconsistent signal direction; and
the weight is smaller when the signal being filtered has a consistent signal direction.

14. The apparatus of claim 12, wherein:
the filter is operable to identify the weight using one of elliptical weighting and diamond weighting;
the elliptical weighting and the diamond weighting are associated with a first maximum value along an axis representing the increment and a second maximum value along an axis representing the cushion;
the first maximum value lies between three and ten; and
the second maximum value lies between 0.75 and one.

15. The apparatus of claim 10, wherein the filter is further operable to identify a bias associated with a prior sample, the bias associated with the prior sample comprising a cushion of zero and an increment representing the entire bias associated with the prior sample.

16. The apparatus of claim 10, wherein the filter comprises a processor.

17. A computer program for filtering a signal, the computer program embodied on a computer readable medium, the computer program comprising computer readable program code for:
receiving a sample of the signal being filtered;
identifying a bias associated with the sample, the bias identifying a difference between an actual value of the sample and an expected value of the sample, the bias comprising a cushion and an increment;
identifying a portion of the bias based at least partially on a size of the cushion; and
outputting the expected value of the sample combined with the portion of the bias.

18. The computer program of claim 17, wherein:
the cushion in the bias is based at least partially on an actual value of a prior sample of the signal and an expected value for the prior sample; and
the increment in the bias is based at least partially on a difference between (1) an actual change between the sample and the prior sample and (2) an expected change between the sample and the prior sample.

19. The computer program of claim 17, wherein the computer readable program code for outputting the expected value of the sample combined with the portion of the bias comprises computer readable program code for:
identifying a weight associated with the bias; and
dividing the bias by the weight to identify the portion of the bias to be combined with the expected value of the sample.

20. The computer program of claim 19, wherein:
the weight is larger when the signal being filtered has an inconsistent signal direction; and
the weight is smaller when the signal being filtered has a consistent signal direction.

21. The computer program of claim 19, wherein:
the computer readable program code for identifying the weight comprises computer readable program code for identifying the weight using one of elliptical weighting and diamond weighting;

the elliptical weighting and the diamond weighting arc associated with a first maximum value along an axis representing the increment and a second maximum value along an axis representing the cushion;

the first maximum value lies between three and ten; and the second maximum value lies between 0.75 and one.

22. The computer program of claim 17, further comprising computer readable program code for identifying a bias associated with a prior sample, the bias associated with the prior sample comprising a cushion of zero and an increment representing the entire bias associated with the prior sample.

* * * * *